United States Patent Office 3,404,152
Patented Oct. 1, 1968

3,404,152
SUBSTITUTED PYRIDYL UREA COMPOUNDS
Kurt Thiele and Günter Steinmetz, Frankfurt am Main, Germany, assignors to Deutsche Gold- und Silber-Scheideanstalt vormals Roessler, Frankfurt am Main, Germany
No Drawing. Filed Aug. 27, 1965, Ser. No. 483,329
Claims priority, application Germany, Aug. 29, 1964, D 45,304
5 Claims. (Cl. 260—295)

ABSTRACT OF THE DISCLOSURE

Compounds of the formula

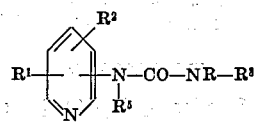

in which $R^1$ and $R^2$ taken individually can be halogen, lower alkyl and lower alkoxy and in addition one of $R^1$ and $R^2$ can also be hydrogen and at least one of $R^3$ and $R^5$ is lower alkyl and the other is hydrogen or lower alkyl. The compounds have valuable therapeutic properties and in particular they possess an excellent anti-inflammatory action.

---

The present invention relates to novel compounds having valuable pharmaceutical properties which are of the formula:

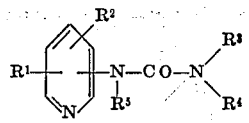

in which $R^1$ and $R^2$ are each selected from the group consisting of halogen atoms and —CN, alkyl, mercapto, alkylthio, hydroxyl, alkoxy, phenoxy, acyloxy, amino, acylamino, carboxyl, carbalkoxy, acylthio, alkylamino, sulfonamido, sulfonic acid, ureido, alkyl ureido and carbamino groups, $R^2$ also may be a hydrogen atom, $R^3$ and $R^4$ are each selected from the group consisting of hydrogen, alkyl and alkenyl groups of 1–6 C atoms, phenyl and substituted phenyl, and $R^5$ is selected from the group consisting of hydrogen, alkyl with 1 to 6 C atoms, phenyl and substituted phenyl. The substituents for the substituted phenyl groups may be trifluoromethyl as well as the substituents defined for $R^1$ and $R^2$. In the substituents defined above where alkyl is included, the alkyl preferably is lower alkyl.

The novel compounds according to the invention are marked by heir valuable therapeutic properties. In particular they exhibit excellent antiphlogistic properties. For example, when administered orally in doses of 50–300 mg./kg. they exhibit excellent anti-inflammatory action on formalin edema and albumen edema of the rat paw. The compounds exhibit toxicity in doses of over 800 mg./kg. in mice.

The novel compounds according to the invention, for example, can be prepared
(1) By reacting a compound of the formula:

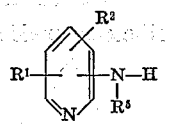

(a) with a compound of the formula

$$O=C=N-R^3 \quad \text{(II)}$$

in molar quantities in the presence of a solvent at temperatures between about 0° C. and 100° C.; (b) with a compound of the formula

in molar quantities in the presence of an acid binding agent or in ratios of 2 mols of compound I per mol of compound III in the presence of a solvent at a temperature between 0° and 180° C.; and (c) with a compound of the formula

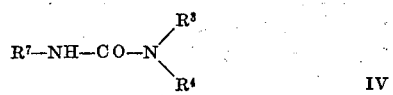

in which $R^7$ is an acyl, preferably acetyl, or a $NO_2$ group in molar quantity or with excess of compound IV, if desired, in the presence of a solvent and expediently at a temperature between 0° and about 200° C.

The novel compounds can also be prepared
(2) By reacting a compound of the formula:

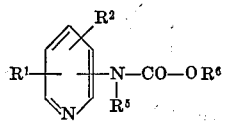

in which $R^6$ signifies a phenyl or benzyl radical with a compound of the formula

in the presence of a solvent at a temperature between about 0° and 200° C.

For instance, toluene, benzene, chlorobenzene, chloroform, carbon tetrachloride, tetrahydrofurane, acetone, dioxane, sulfolane, N-methyl-pyrrolidone and dimethyl sulfoxide can be used as solvents for the processes 1a and 1b and 2. In addition, water can also be used as solvent for process 2.

Water or glacial acetic acid preferably are used as the solvents for process 1c. However, in addition thereto other inert high boiling solvents such as α-methyl naphthalene also can be used.

Alkali metal hydroxide, carbonates or bicarbonates, as well as organic bases, such as triethylamine, tributylamine, pyridine, dimethylaniline, ethyl piperidine and the like can, for example, be employed as the acid binding agent in process 1b.

The following examples will serve to illustrate the compounds according to the invention.

EXAMPLE 1

N-[6-methyl-pyridyl-(2)]-N'-methyl-urea

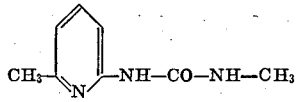

8 g. of 6-methyl-2-amino-pyridine were dissolved in 25 ml. of benzene and 4.2 g. of methyl isocyanate added thereto. The mixture was allowed to stand overnight and the reaction product was then filtered off. After recrystallization from alcohol, 4.5 g. of the product with a melting point of 166° C. were obtained.

EXAMPLE 2

N-[5-chloropyridyl-(2)]-N'-propyl-urea

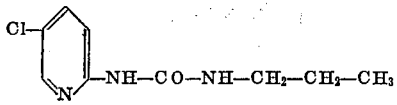

25.7 g. of 5-chloro-2-amino-pyridine were dissolved in 70 ml. or dioxane and 17 g. of propyl isocyanate added thereto. The reaction mixture was allowed to stand for 2 days and then ½ of the solvent was distilled off. Upon cooling the substituted urea product crystallized out. After recrystallization from alcohol, 18 g. of the product with a melting point of 102–103° C. were obtained.

EXAMPLE 3

N-[3,5-dichloropyridyl-(2)]-N'-methyl-urea

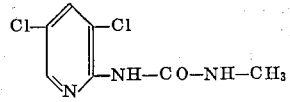

47 g. of 3,5-dichloro-2-carbethoxyamino-pyridine were heated together with 600 ml. of a 40% methylamine solution for 4 hours in an autoclave at 100° C. After the reaction mixture cooled down the substituted urea product was filtered off, boiled out with gasoline and recrystallized from alcohol. 30 g. of the product with a melting point of 159–160° C. were obtained.

EXAMPLE 4

N-[6-methyl-pyridyl-(2)]-N-methyl-urea

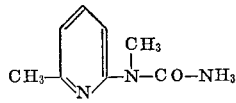

108 g. of 6-methyl-2-amino-pyridine were heated together with 74 g. of N-methyl-urea for 2 hours at 170–175° C. and then for 4 further hours at 175–180° C. After cooling down the product was recrystallized from water. The melting point of the product was 160–161° C.

EXAMPLE 5

N-[6-methyl-pyridyl-(2)]-N',N'-dimethyl-urea

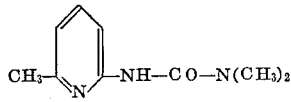

10.1 g. of triethylamine were added to a solution of 10.8 g. of 6-methyl-2-amino-pyridine in 100 ml. of dry chloroform and then a solution of 10.8 g. of dimethylcarbamyl chloride in 30 ml. of chloroform added portionwise. The mixture was then boiled for 5 hours under reflux. The reaction mixture was then boiled down to dryness and the residue treated with water and recrystallized from alcohol. The melting point of the product was 192–193° C.

EXAMPLE 6

N-[5-chloro-pyridyl-(2)]-N'-phenyl-urea

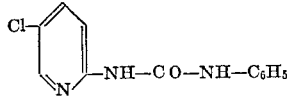

A solution of 25.7 g. of 5-chloro-2-amino-pyridine in 70 ml. of dioxane was mixed with a solution of 23.8 g. of phenyl isocyanate in 20 ml. of dioxane and the mixture allowed to stand for 24 hours. Thereafter the reaction mixture was heated for 1 hour on a water bath and then cooled down. The substituted urea product was filtered off and recrystallized from dioxane. 31 g. of the product with a melting point of 206° C. were obtained.

EXAMPLE 7

N-[4-chloro-pyridyl-(3)]-N'-methyl-urea

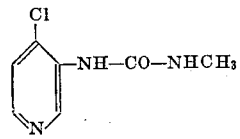

13.8 g. of 3-amino-4-chloro-pyridine were dissolved in 35 ml. of benzene and 6.1 g. of methyl isocyanate added thereto. After standing for 24 hours the product was filtered off and dissolved in ethyl acetate, boiled up with charcoal, filtered and allowed to stand. 6 g. of the product with a melting point of 109–110° C. were obtained.

EXAMPLE 8

N-[6-bromo-4-ethyl-pyridyl-(2)]-N'-methyl-urea

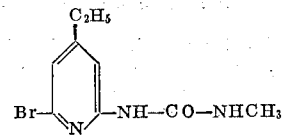

5 g. of amino-4-ethyl-6-bromo-pyridine were dissolved in 30 ml. of benzene and 1.5 g. of methyl isocyanate added thereto. After 24 hours' standing the reaction product was filtered off and recrystallized from ethanol. 4 g. of the product with a melting point of 156–157° C. were obtained.

EXAMPLE 9

N-[6-amino-pyridyl-(2)]-urea

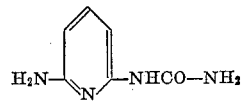

21.6 g. of 2-amino-6-carbethoxyamino-pyridine were heated together with 120 ml. of 3 N alcoholic ammonia in an autoclave at 110° C. for 12 hours. The solvent was distilled off and the residue recrystallized from alcohol. 13.5 g. of the product with a melting point of 177–178° C. were obtained.

EXAMPLE 10

N-methyl-N'-[4,6-dimethyl-pyridyl-(2)]-urea

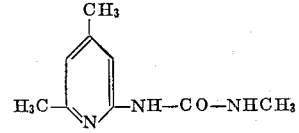

32.1 g. of 4,6-dimethyl-2-amino-pyridine were dissolved in 100 ml. of warm benzene, 15 g. of methyl isocyanate added thereto and the mixture immediately cooled. After standing for 24 hours the product was filtered off from the reaction mixture and recrystallized from ethanol. 22 g. of the product with a melting point of 145° C. were obtained.

EXAMPLE 11

N-methyl-N'-pyridyl-(4)-urea

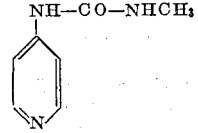

25 g. of 4-amino-pyridine were dissolved in 200 ml. of dioxane and 15 g. of methyl isocyanate added thereto. After the mixture had stood for 3 days 100 ml. of the dioxane were distilled off and 50 ml. of acetone added whereupon the product crystallized out. After recrystallization from acetone, 22.8 g. of the product with a melting point of 151° C. were obtained.

EXAMPLE 12

2,6-bis-(N'-methyl-ureido)-pyridine

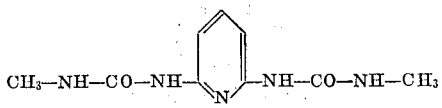

7.7 g. of 2,6-diamino-pyridine were dissolved in 80 ml. of dioxane and 8 g. of methyl isocyanate added thereto.

After 2 days' standing the reaction product was filtered off and recrystallized from methanol. 9.2 g. of the product with a melting point of 233° C. (with decomposition) were obtained.

EXAMPLE 13

N-methyl-N'-[2-butoxy-pyridyl-(5)]-urea

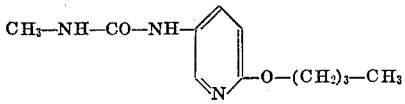

20.3 g. of 2-butoxy-5-amino-pyridine were dissolved in 30 ml. of water. Subsequently 30 ml. of dioxane were added followed by addition of 4 g. of NaOH dissolved in 9 ml. of water with cooling. Then 6 g. of methyl iocyanate were added to the resulting mixture. After 2 days' standing the product was filtered off and recrystallized from 30% ethanol. 19 g. of the product with a melting point of 138° C. were obtained.

EXAMPLE 14

N-methyl-N'-[3,5-dibromo-pyridyl-(2)]-urea

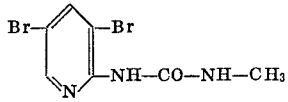

50.4 g. of 3,5-dibromo-2-amino-pyridine were dissolved in 150 ml. of benzene and 22.8 g. of methyl isocyanate added thereto. The mixture was heated from 6 hours to 50–60° C., a further 22.8 g. of methyl isocyanate added and the heating at 50–60° C. continued for another 6 hours. After cooling the product was filtered off and recrystallized from ethanol. 27 g. of the product with a melting point of 146–147° C. were obtained.

EXAMPLE 15

N-methyl-N'-[5-chloro-2-(2-carbethoxy-phenoxy)-pyridyl-(3)]-urea

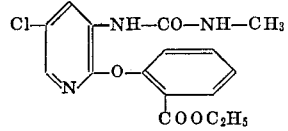

10 g. of 5-chloro-3-amino-2-(2-carbethoxy-phenoxy)-pyridine were dissolved in 30 ml. of benzene and 2 g. of methyl isocyanate added thereto. The reaction mixture was allowed to stand for 1 day and a further 3 g. of methyl isocyanate added thereto whereupon the mixture was heated 5 hours at 50–60° C. and allowed to stand at room temperature for 2 days. The reaction product was filtered off and recrystallized from ethanol. 7 g. of the product with a melting point of 137° C. were obtained.

EXAMPLE 16

N-methyl-N'-[5-carbamoyl-pyridyl-(2)]-urea

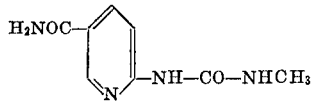

19.4 g. of 6-amino-nicotinic acid amide were dissolved in 100 ml. of dimethyl-sulfoxide at 50–60° C. and 6 g. of methylisocyanate added thereto. The mixture was held at 50–60° C. for 16 hours, a further 6 g. of methylisocyanate having been added after 8 hours. After the reaction mixture was allowed to stand overnight at room temperature the product was filtered off and recrystallized from 30% acetic acid. 19 g. of the product with a melting point of 272° C. were obtained.

EXAMPLE 17

N-[5-chloro-pyridyl-(2)]-N'-methyl-urea was prepared analogously to example 2 using methyl isocyanate. Its melting point was 194–5°.

EXAMPLE 18

N-[2-chloro-pyridyl-(5)]-N'-methyl-urea was prepared analogously to example 2 using 2-chloro-5-amino-pyridine and methyl isocyanate. Its melting point was 205–6°.

EXAMPLE 19

N-[6-chloro-pyridyl-(2)]-N'-propyl-urea was prepared analogously to example 2 using 2-amino-6-chloro-pyridine. Its melting point was 102–3°.

EXAMPLE 20

N-[5-bromo-pyridyl-(2)]-N'-methyl-urea was prepared analogously to Example 3 using 2-amino-5-bromo-pyridine. Its melting point was 205°.

We claim:
1. N-[2-chloro-pyridyl-(5)]-N'-methyl-urea
2. N-[5-bromo-pyridyl-(2)]-N'-methyl-urea
3. N-[6-chloro-pyridyl-(2)]-N'-propyl-urea
4. N-[5-chloro-pyridyl-(2)]-N'-propyl-urea
5. N-[3,5-dichloro-pyridyl-(2)]-N'-methyl-urea.

References Cited

UNITED STATES PATENTS 3,293,257  12/1966  Woods et al. _____ 260—295

OTHER REFERENCES

Bernstein et al.: J. Am. Chem. Soc., vol. 69, pp. 1151–8 (1947).

Chem. Abstracts (I), vol. 31, par. 687 (1937).

Buu-Hoi: J. Chem. Soc. (London), 1958, pp. 2815–17.

HENRY R. JILES, *Primary Examiner.*

A. L. ROTMAN, *Assistant Examiner.*